May 7, 1968 R. D. MEIER 3,382,422
POSITIONING CONTROL CIRCUIT INCLUDING A SIGNAL PROPORTIONAL
TO THE SMALLER OF ERROR AND RATE SIGNALS
Filed Feb. 23, 1965

INVENTOR.
ROGER D. MEIER
BY

United States Patent Office 3,382,422
Patented May 7, 1968

3,382,422
POSITIONING CONTROL CIRCUIT INCLUDING A SIGNAL PROPORTIONAL TO THE SMALLER OF ERROR AND RATE SIGNALS
Roger D. Meier, Menominee Falls, Wis., assignor to Square D Company, Park Ridge, Ill., a corporation of Michigan
Filed Feb. 23, 1965, Ser. No. 434,463
9 Claims. (Cl. 318—18)

This invention relates to an electrical positioning system for machine tools and the like, and more particularly to a circuit component for use in such systems that respond to an error signal indicative of a desired or null position of a movable machine element and to an adjustable rate signal indicative of a desired initial speed of movement of the machine element toward the null position to provide a speed signal related to the smaller of the error and rate signals.

In the automatic operation of machine tools, for example, it is common practice to use a position transducer for providing an error signal in the form of an alternating voltage, the magnitude of which depends upon the distance between a movable machine element and a null position to which it is to move and the phase of which is indicative of the direction that the machine element is to move to reach the null position. Means are known for rectifying the alternating error signal from such a position transducer to provide an error signal in the form of a unidirectional voltage, the magnitude of which depends upon the distance to be moved and the polarity of which is indicative of the desired direction of movement. Generally, such position transducers provide an upper limit for the error signal so that for large movements the error signal is relatively constant. When the null position is approached, the error signal decreases gradually from its maximum value in proportion to the remaining distance of travel becoming zero when the null position is reached.

A speed controlling servo-amplifier capable of controlling the speed of a motor in proportion to the magnitude of an input signal in the form of a voltage is ideally suited to control the speed of a motor driving a moving machine element in response to an error signal, such as described above, for relatively short movements and during the latter part of relatively long movements. However, because the error signal is at a fixed maximum value when long travel distances are required, reliance on the error signal alone does not provide for an adequate high speed for the long travel distances or for a choice of various high speeds. For large movements of the machine element, it is desirable that provision be made to control the speed of the element selectively within a wide range of relatively high speeds when the element is remote from the null position, the error signal being effective to control the speed only as the null position is approached.

In accordance with this invention, there is provided a circuit component, hereinafter sometimes termed a crossover circuit component or unit, for a positioning system which component is responsive concurrently to an adjustable rate signal and an error signal to provide an output signal which is related only to the rate signal so long as the rate signal is less than the error signal. During decrease of the error signal as the null position is approached, the error signal becomes less than the rate signal and thereafter the output signal of the crossover unit it related only to the error signal. The output signal is impressed on a servo-amplifier which maintains the speed of a motor proportional to the magnitude of the output signal. Thus, for large distances of travel, speed is determined by the rate signal which can be adjusted over a wide range to provide a selection of speed. As the null position is approached, the output signal is determined by the error signal and the servo-amplifier responds to cause the speed of the motor to decrease as the error signal decreases, thereby resulting in a gradual slowdown until the null position is reached. The polarity of the error signal depends upon the desired direction of movement, the polarity of the output signal at all times depends upon the polarity of the error signal, and the servo-amplifier is responsive to the polarity of the output signal to determine the direction of rotation of the motor.

An object of this invention is to provide an improved electrical circuit component which provides an output signal related in magnitude to the smaller of two input signals.

A further object is to provide a crossover circuit component for producing an output signal directly proportional to a preselected reference or rate signal so long as the rate signal is less than an error signal and to produce an output signal directly proportional to the error signal when the error signal becomes less than the rate signal.

Another object is to provide a crossover circuit component which provides an output signal related in magnitude to whichever of two input signals is smaller and related in polarity to one of said input signals.

Further objects and advantages of the invention will become apparent from the following specification wherein reference is made to the drawings, in which.

Figure 1:
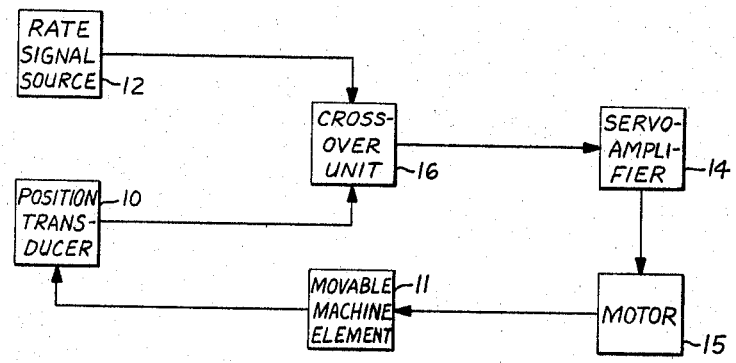
FIG. 1 is a block diagram of a positioning system incorporating a crossover circuit component in accordance with this invention.

Referring to FIG. 1, the invention is shown as used in connection with a positioning system having a position transducer 10 providing an error signal dependent upon the position of a movable machine element 11, a rate signal source 12 providing a reference or rate signal of adjustable magnitude, and a servo-amplifier 14 which responds to an input signal to control a motor 15 driving the movable machine element 11. The signals from the transducer 10 and the rate signal source 12 are impressed on a crossover circuit component or unit 16 in accordance with this invention to supply the input signal to the servo-amplifier 14. As will become apparent, each of the foregoing signals is in the form of a voltage. The transducer 10 may be of the type disclosed in Bulliet et al. Patent 2,962,652 issued Nov. 29, 1960, and the servo-amplifier 14 may be of any suitable type for controlling either an electric or hydraulic motor in response to an input voltage.

Figure 2:
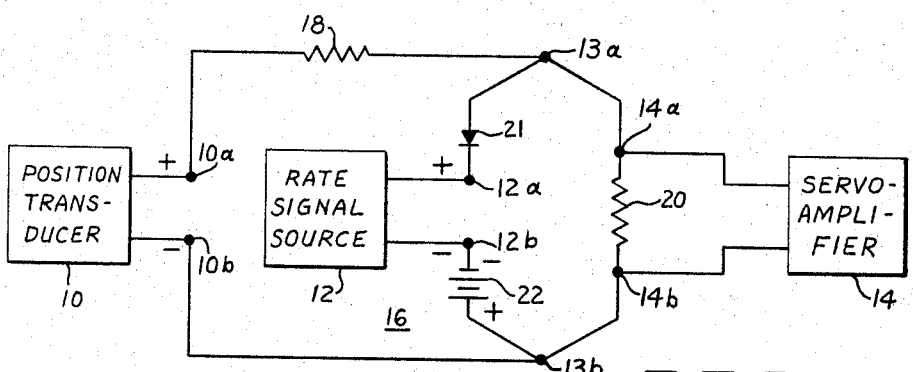
FIGS. 2 and 3 are wiring diagrams of embodiments of the invention arranged for response to a single polarity and to opposite polarities, respectively.

Referring now to FIG. 2, a single polarity crossover circuit unit 16 in accordance with this invention comprises a pair of resistors 18 and 20, rectifier means in the form of a diode 21, terminals 10a and 10b for connection to the transducer 10, terminals 12a and 12b for connection to the rate signal source 12, terminals 13a and 13b, and terminals 14a and 14b for connection to the servo-amplifier 14. The resistor 18 has a small resistance relative to the resistance of the resistor 20, and the resistors 18 and 20 are connected in series with each other across the terminals 10a and 10b, the terminals 14a and 14b being at opposite ends of the resistor 20. The diode 21 and the terminals 12a and 12b are in series with each other and the series combination thus formed is connected in parallel with the resistor 20 between the terminals 13a and 13b. The crossover unit 16 is shown in FIG. 2 with the output of the transducer 10 connected to the terminals 10a and 10b, the output of the rate signal source 12 connected to the terminals 12a and 12b, and the input of the servo-amplifier 14 connected to the terminals 14a and 14b.

With the polarities indicated, when the voltage at the transducer 10 is less than the voltage at the rate signal source 12, the diode 21 is back-biased and does not conduct. Hence, the voltage across the resistor 20 at the terminals 14a and 14b, and thus at the servo-amplifier 14, is proportional to the voltage at the transducer 10 and, because the resistance of the resistor 20 is much larger than the resistance of the resistor 18, is but slightly less than the voltage at the transducer 10. When the voltage at the transducer 10 is larger than the voltage at the rate signal source 12, the diode 21 conducts and the additional current flowing through the resistor 18 causes a voltage drop which subtracts from the voltage at the rate signal source 12 to cause the voltage across the resistor 20 at the terminals 14a and 14b, and thus at the servo-amplifier 14, to be substantially equal to the voltage at the rate signal source 12.

If the diode 21 had no voltage drop and if the rate signal source 12 had no internal resistance, the voltage at the servo-amplifier 14 would be exactly equal to the voltage at the rate signal source 12 when the diode 21 is conducting. However, the voltage drops across the diode 21 and internally of the rate signal source 12 cause the voltage at the terminals 14a and 14b to be slightly larger than the voltage at the source 12 by a substantially fixed amount. A voltage can be subtracted from the voltage produced by the source 12 to compensate for this by interposition of a fixed voltage source, shown as a battery 22, in the circuit branch containing the series connected terminals 12a and 12b and between the terminals 13a and 13b and the diode 21. Other voltage sources can be similarly inserted to compensate for other factors such as static inertia or leakage of the motor 15 if it is a hydraulic motor.

Figure 3:
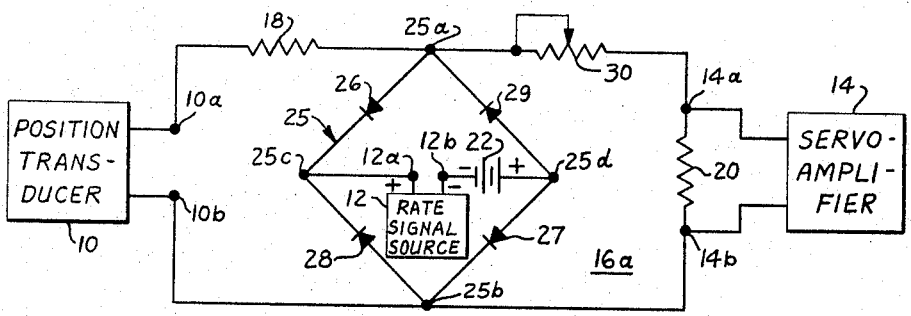

When the transducer 10 is of the type producing an output signal having a polarity dependent upon the direction of movement desired, a crossover unit 16a in accordance with the invention and shown in FIG. 3 may be used. In FIG. 3, the transducer 10 is connected to the terminals 10a and 10b as in FIG. 2 and the output voltage of the transducer 10 is thus impressed through the resistor 18 across a first pair of terminals 25a and 25b of a rectifier means such as the diode bridge comprising four diodes 26, 27, 28 and 29. The resistor 20 is also connected across the terminals 25a and 25b and the servo-amplifier is connected across the resistor 20 at the terminals 14a and 14b. If desired, an adjustable resistor 30 may be connected in series with the resistor 20 as by insertion in the circuit between the terminals 25a and 14a. The output of the rate signal source 12 is impressed on a second pair of terminals 25c and 25d of the bridge 25 by connection with the terminals 12a and 12b in series with the battery 22.

When the terminal 10a in FIG. 3 is positive and the voltage at the transducer 10 is less than the voltage at the rate signal source 12, the voltage at the servo-amplifier 14 is substantially equal to the voltage at the transducer 10, less the voltage drop in the resistor 30, and the terminal 14a is positive. When the polarity of the voltage at the transducer 10 reverses, the terminal 10b becomes positive, and the terminal 14b becomes positive. Because of the action of the diode bridge 25, whenever the voltage at the transducer 10 becomes larger than the voltage at the rate signal source 12, either the diodes 26 and 27 or the diodes 28 and 29, depending upon the polarity of the voltage at the terminals 10a and 10b, conduct so that the voltage at the servo-amplifier 14 becomes dependent upon the voltage at the rate signal source 12 but with a polarity corresponding to that of the voltage at the transducer 10.

Figure 4:
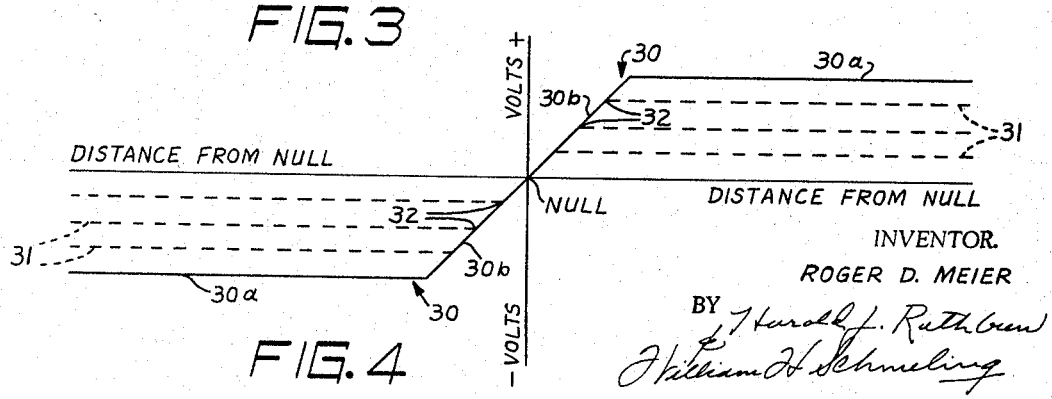
FIG. 4 is a graph helpful in an understanding of the invention.

Further understanding of the operation of the crossover units 16 and 16a of FIGS. 2 and 3 may be had with reference to FIG. 4 which is a graph relating the magnitude and polarity of the error signal to the distance of the machine element in opposite directions from a null position. A solid line curve 30 shows the variation of the error signal with distances for opposite directions of movement, portions 30a indicating the constant fixed magnitude for longer movements and portions 30b indicating the decrease in the error signal as the null position is approached. Broken-line curves 31 indicate various adjusted values of the rate signal, it being understood that the polarity of the rate signal does not change, the curves 31 being shown in two quadrants for comparison with the curve 30 for both polarities of the error signal. So long as the magnitude of the rate signal without reference to polarity is less than the error signal, the output of the crossover unit 16a of FIG. 3 at the servo-amplifier 14 is determined by the rate signal as to magnitude and by the error signal as to polarity. At various distances from the null position indicated as 32, dependent upon the selected magnitude of the rate signal, the error signal becomes less than the rate signal and thereafter the signal at the servo-amplifier 14 is dependent in both magnitude and polarity on the error signal.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical circuit component for use in a positioning system and responsive to a variable error signal and a rate signal, either of which might be smaller than the other at any instant, to provide an output signal proportional to the smaller of the error and rate signals, said component comprising a first resistor of relatively small resistance and a second resistor of relatively large resistance connected in series with each other to form a series circuit, means for impressing the error signal as a voltage across said series circuit, rectifier means connected in series with said first resistor and in parallel with said second resistor to form a branch circuit, said rectifier being poled to conduct current flowing in said first resistor as a result of said impression of the error signal, means for impressing the rate signal as a voltage in said branch circuit in opposition to the error signal, and means at the terminals of said second resistor to provide an output signal.

2. An electrical circuit component in accordance with claim 1 characterized in that a compensating voltage source is interposed in said branch circuit in opposition to the rate signal to compensate for the voltage drop across said rectifier.

3. An electric circuit component in accordance with claim 1 characterized in that said rectifier means is a single diode.

4. An electric circuit component for use in a positioning system and responsive to a variable error signal and a rate signal, either of which might be smaller than the other at any instant, to provide an output signal proportional to the smaller of the error and rate signals, said component comprising a first resistor of relatively small resistance and a second resistor of relatively large resistance connected in series with each other to form a series circuit, terminal means for impressing the error signal as a voltage on said series circuit between non-adjacent ends of said resistors, rectifier means connected in series with said first resistor and said terminal means and in parallel with said second resistor to form a branch circuit, said rectifier means being poled to conduct current flowing in said first resistor as a result of said impression of the error signal, means for impressing the rate signal as a voltage in said branch circuit in opposition to the error signal, and terminal means at the ends of said second resistor for connection to a means responsive to an output signal of said component.

5. An electric circuit component for use in a positioning system and responsive to a variable error voltage from an error signal source and an adjustable rate voltage from a rate signal source, either of which voltages might be smaller than the other at any instant, to provide an output voltage proportional to the smaller of the error and rate voltages, said component comprising a first resistor of relatively small resistance and a second resistor of relatively large resistance, a first pair of terminals for connection to the source of error voltage, means connecting said first and second resistors and said terminals in a first series circuit, rectifier means, a second pair of terminals for connection to the rate signal source, means connecting the rectifier means and the second pair of terminals in series with each other and the second series combination thus formed in parallel with said second resistor, said rectifier means being poled to permit current to flow from said error signal source into said second series circuit, and means at the opposite ends of said second resistor to provide an output signal.

6. An electrical circuit component for use in a positioning system and responsive to a rate voltage and an error voltage of variable magnitude and selective polarity to provide an output voltage proportional to the smaller of the error and rate voltages at any instant and at a polarity corresponding to the selected polarity of the error voltage, said component comprising a first resistor of relatively small resistance and a second resistor of relatively large resistance connected in series with each other to form a series circuit, means for impressing the error voltage across said series circuit, a four-terminal diode bridge having four legs with four diodes inserted in said legs, respectively, one pair of the terminals of said bridge being connected to opposite ends of the second resistor, respectively, means for impressing the rate voltage across the other pair of the terminals of the bridge, the diodes of the bridge being so poled that the rate signal voltage is at all times in opposition to the voltage at said one pair of terminals of the bridge resulting from said impression of the error voltage, and terminal means at said opposite ends of said second resistor to provide an output signal.

7. A positioning system comprising a transducer providing a unidirectional error voltage of variable magnitude a rate signal source providing a unidirectional rate voltage of adjustable magnitude, a first resistor of relatively small resistance, rectifier means, means connecting said transducer, said first resistor, said rectifier means, and said rate signal source in a loop circuit with the transducer and the rate signal source so poled that their respective voltages are in opposition, a second resistor of relatively high resistance, means connecting said second resistor in parallel with said rectifier means and said rate voltage source and in series with said first resistor and said transducer, said rectifier being poled to permit current produced by the voltage of said transducer to flow through said first resistor, and terminal means at the ends of said second resistor to provide an output voltage.

8. An electric circuit component in accordance with claim 7 characterized in that said rate voltage source has an internal resistance, and a fixed voltage source is inserted in series with the rectifier means and the rate voltage source and in parallel with the second resistor to compensate for the voltage drops across said rectifier means and caused by said internal resistance.

9. A positioning system comprising a transducer providing a unidirectional error voltage of variable magnitude and selective polarity, a rate signal source providing a unidirectional rate voltage of adjustable magnitude, a first resistor of relatively small resistance, rectifier means, means connecting said transducer, said first resistor, said rectifier means, and said rate signal source in a loop circuit, a second resistor of relatively high resistance, means connecting said second resistor in parallel with said rectifier means and said rate voltage source and in series with said first resistor and said transducer, said rectifier means being so poled as to permit current to flow from said transducer through said resistors irrespective of the polarity of the error voltage, the polarity of the rate voltage being such that rectifier means is back-biased thereby, and terminal means at the ends of said second resistor to provide an output voltage.

No references cited.

ORIS L. RADER, *Primary Examiner.*

G. SIMMONS, *Assistant Examiner.*